United States Patent
Bosveld et al.

(10) Patent No.: US 10,108,016 B2
(45) Date of Patent: Oct. 23, 2018

(54) HEADBAND COMFORT AND FIT ADJUSTMENT MECHANISMS

(71) Applicant: Microsoft Technology Licensing, LLC, Redmond, WA (US)

(72) Inventors: Paul Bosveld, Seattle, WA (US); Philip Andrew Frank, Kirkland, WA (US); Henric Jentz, Seattle, WA (US); Nicolas Denhez, Seattle, WA (US); Travis Justin Hosler, Seattle, WA (US); Errol Mark Tazbaz, Bellevue, WA (US); Aditha May Adams, Seattle, WA (US); William Dieter, Portland, OR (US); Simon Quay, Portland, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 637 days.

(21) Appl. No.: 14/463,902

(22) Filed: Aug. 20, 2014

(65) Prior Publication Data

US 2016/0054570 A1    Feb. 25, 2016

(51) Int. Cl.
*A42B 1/20* (2006.01)
*G02B 27/01* (2006.01)
*A41D 20/00* (2006.01)

(52) U.S. Cl.
CPC ......... *G02B 27/0176* (2013.01); *A41D 20/00* (2013.01); *G02B 27/0149* (2013.01); *G02B 2027/0154* (2013.01)

(58) Field of Classification Search
CPC ............ G02B 27/0176; G02B 27/0149; G02B 2027/0154; A41D 20/00
See application file for complete search history.

(56) References Cited

U.S. PATENT DOCUMENTS

| | | | |
|---|---|---|---|
| 5,321,416 A | 6/1994 | Bassett et al. | |
| 5,572,749 A | 11/1996 | Ogden | |
| 5,844,530 A | 12/1998 | Tosaki | |
| 5,954,642 A * | 9/1999 | Johnson | G02B 27/017 600/300 |
| 6,677,919 B2 | 1/2004 | Saito | |
| 7,798,666 B2 | 9/2010 | Lehrl et al. | |
| 8,296,868 B2 * | 10/2012 | Belanger | A42B 3/324 2/414 |
| 2008/0238815 A1 | 10/2008 | Ishino et al. | |

(Continued)

OTHER PUBLICATIONS

"International Search Report & Written Opinion Received for PCT Application No. PCT/US2015/044945", dated Nov. 9, 2015, 9 Pages.

(Continued)

*Primary Examiner* — Sally Haden
(74) *Attorney, Agent, or Firm* — Rainier Patents, P.S.

(57) ABSTRACT

A headband is disclosed for supporting a head-worn device with a comfortable and non-intrusive fit. In examples, the headband includes first and second loops supporting the headband on a wearer's head, and an adjustment mechanism for tightening the first and second loops. The adjustment mechanism tightens down the loops to a desired fit, at which point further actuation of the adjustment mechanism has no effect on the loops.

20 Claims, 6 Drawing Sheets

(56) References Cited

U.S. PATENT DOCUMENTS

2009/0066607 A1* 3/2009 Yasuda .............. G02B 27/0176
 345/8
2012/0229367 A1 9/2012 Magyari

OTHER PUBLICATIONS

"Second Written Opinion Issued in PCT Application No. PCT/US2015/044945", dated Jul. 15, 2016, 6 Pages.
"International Preliminary Report on Patentability Issued in PCT Application No. PCT/US2015/044945", dated Nov. 2, 2016, 7 Pages.
Response to International Search Report & Written Opinion filed Feb. 23, 2016 in International Patent Application No. PCT/US2015/044945, 12 Pages.

* cited by examiner

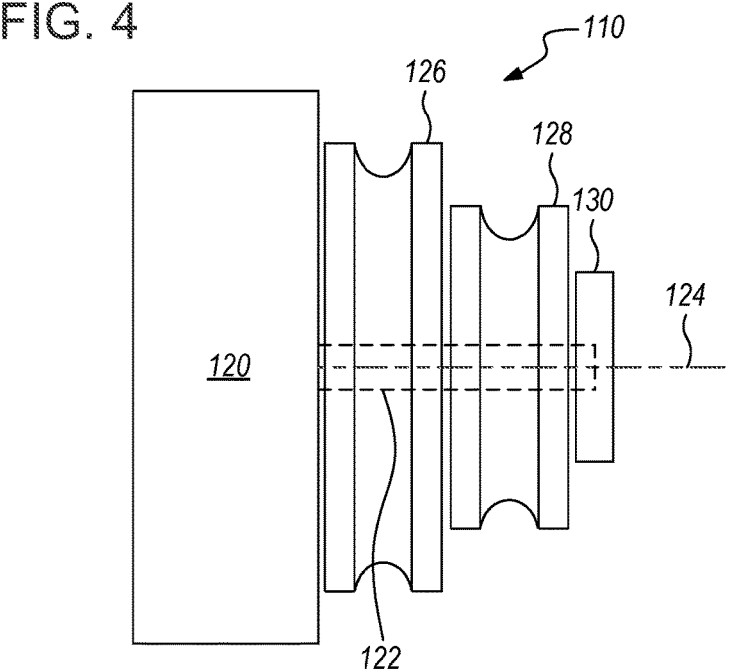
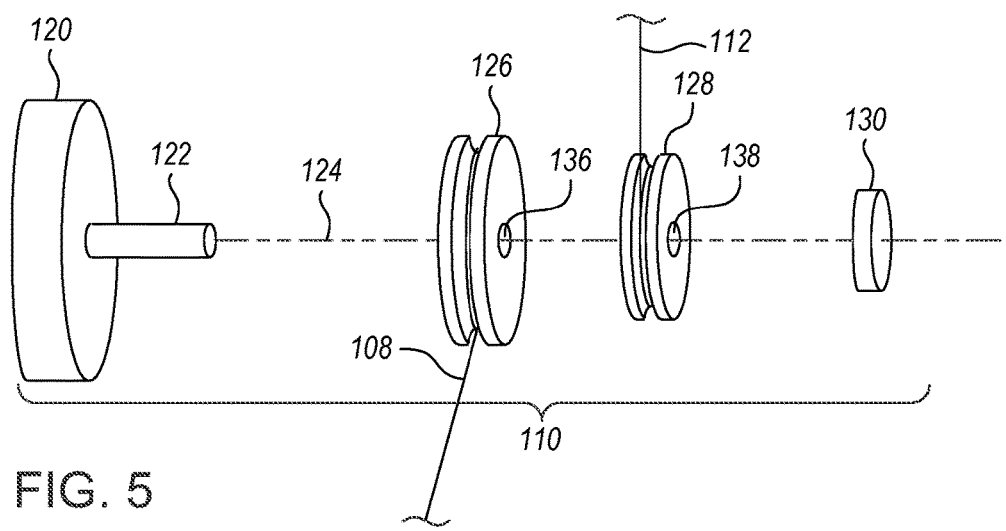

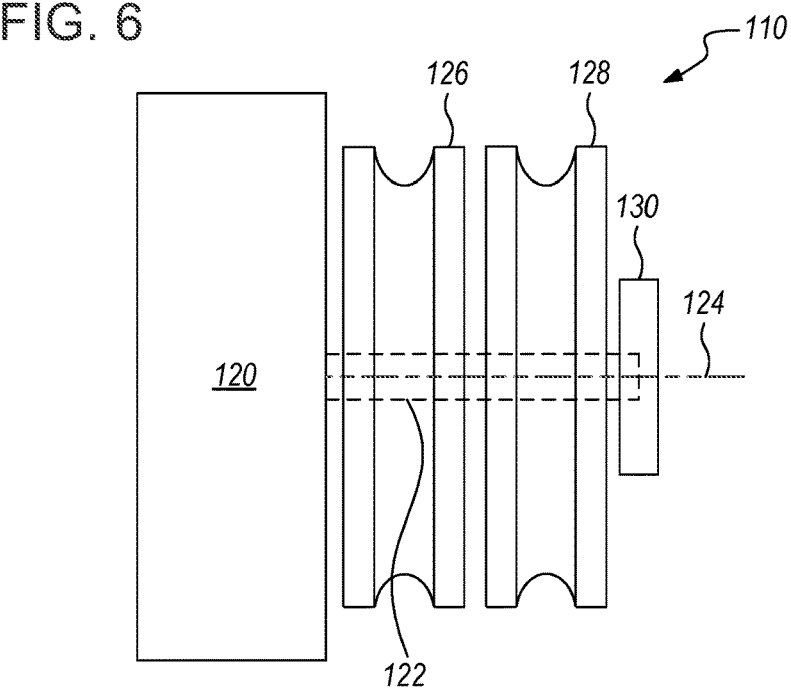
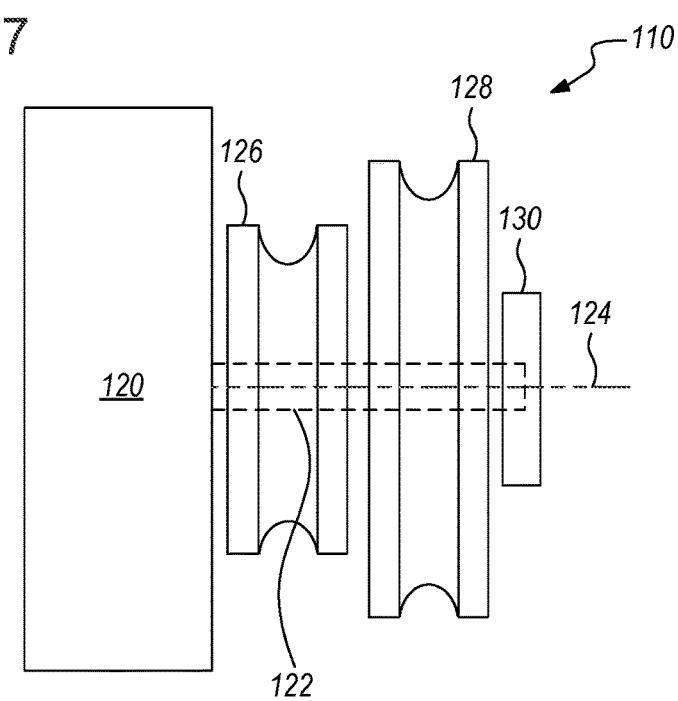

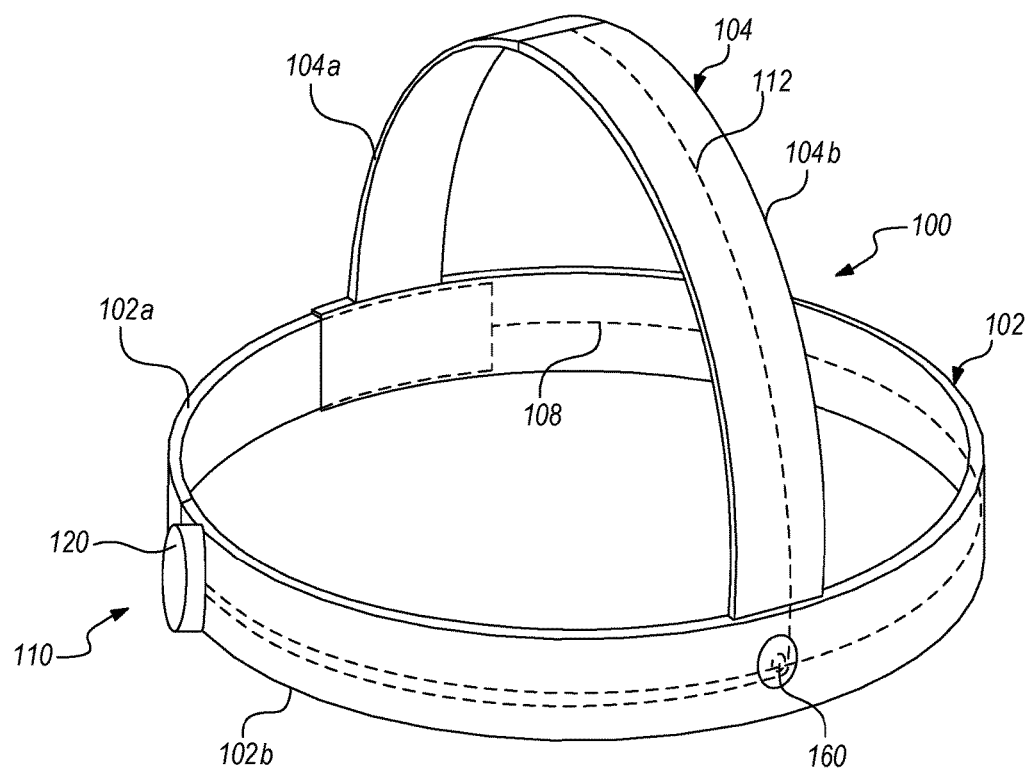

HEADBAND COMFORT AND FIT ADJUSTMENT MECHANISMS

BACKGROUND

A head-worn device, such as a head mounted display (HMD), may be worn by a user for an augmented or virtual reality experience. Current headbands for supporting HMDs and other head-worn devices suffer the drawback that they do not evenly distribute or support the weight of the head-worn device and headband around a user's head. Consequently, pressure points develop at areas of the head bearing a greater proportion of the load, and these devices become uncomfortable to wear over prolonged periods of time. One reason for this drawback is that users have different head sizes and shapes, and existing designs do not adequately account for these size and shape variations.

SUMMARY

The present technology relates to various embodiments of a headband. The headband may include a first loop positioned around the head, and possibly a second loop affixed to the first loop and positioned over the head. The first loop and second loops may be adjustable to different sizes and with respect to each other. In embodiments, a single adjustment mechanism may be provided for simultaneously adjusting the around-the-head loop (referred to herein as the crown loop) and the overhead loop to a proper fit on a user's head. In embodiments, the headband may be used to support an HMD for presenting an augmented or virtual reality experience to the user, though the headband may have other uses in further embodiments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is a side view of an adjustment mechanism for adjusting both the crown loop and overhead loop.

FIG. 5 is an exploded perspective view of an adjustment mechanism for adjusting both the crown loop and overhead loop.

FIGS. 6 and 7 are side views of adjustment mechanisms for adjusting both the crown loop and overhead loop according to further embodiments of the present technology.

FIG. 10 is a headband where the adjustment mechanism is located at a rear of the headband according to further embodiments of the present technology.

DETAILED DESCRIPTION

Embodiments of the present technology will now be explained with reference to the figures, which in general relate to a headband for supporting a head-worn device with a comfortable and non-intrusive fit. Embodiments of the headband include a crown loop, which is a generally horizontal loop when worn on a user's head. An overhead loop, is connected to the crown loop so as to be generally vertical when worn on user's head. An adjustment mechanism is provided that provides quick and easy adjustment of both the crown and overhead loops at the same time.

In general rotation of a tightening knob of the adjustment mechanism tightens down the crown loop to a snug and comfortable fit around a user's head. Once at that fit, further rotation of the tightening knob has no effect on the crown loop. Similarly, rotation of the tightening knob tightens down the overhead loop to a snug and comfortable fit over a user's head. Once at the final fit, further rotation of the tightening knob has no effect on the overhead loop.

The adjustment mechanism of the present technology allows customized fit of the headband for different users and different head sizes, shapes and comfort preferences. The adjustment mechanism of the present technology also provides load distribution, long axis (front to back) compression, and compression against sides of the user's head. Such a distribution of forces provides comfort, in part by preventing pressure points, especially in those areas more sensitive to pain such as for example the nose, ears or the top of the head.

The terms "top" and "bottom," "upper" and "lower," "vertical" and "horizontal" and "front" and "back" as may be used herein are by way of example and illustrative purposes only, and are not meant to limit the description of the invention inasmuch as the referenced item can be exchanged in position and orientation. Also, as used herein, the terms "approximately," "substantially" and/or "about" mean that the specified dimension or parameter may be varied within an acceptable manufacturing tolerance for a given application. In one embodiment, the acceptable manufacturing tolerance is ±0.25%.

In embodiments described below, the headband may be used for supporting an HMD providing a virtual and/or augmented reality experience. However, in alternate embodiments, the headband may be used to mount other head-worn devices, such as surgical loupes, high-power headlamps and other types of head mounted devices.

In addition to comfort, the headband in embodiments of the present technology maintains a precision fit around a user's head. For example, it is desirable with augmented and virtual reality HMDs that the optics be maintained in a precise alignment to a user's eyes, as even a slight misalignment can impair the stereoscopic effect. By preventing pressure points, the headband may be held securely in place with a relatively large compressive force that is evenly distributed around a user's head.

Figure 1:
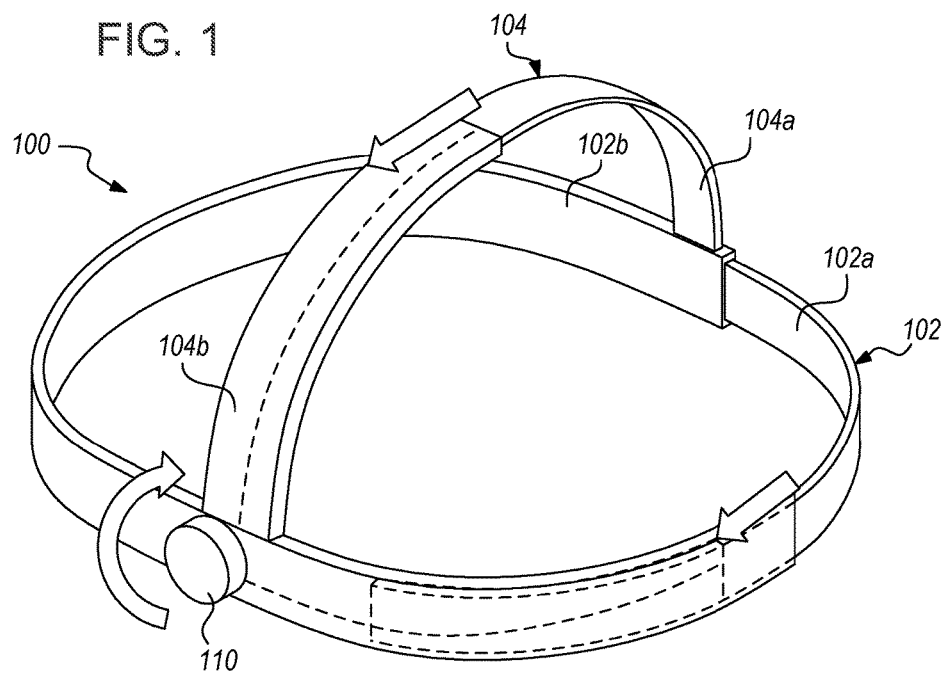
FIG. 1 is a perspective view of a headband according to an embodiment of the present technology.
Figure 2:
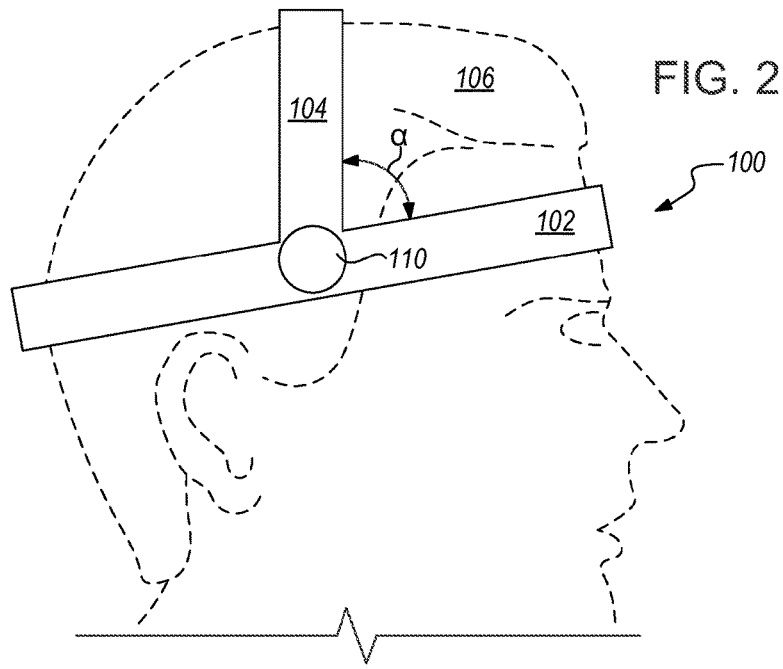
FIG. 2 is a side view of an embodiment of a headband including a crown loop and overhead loop worn by a user.

FIG. 1 is perspective view of an embodiment of a headband 100 having a crown loop 102 coupled to an overhead loop 104. FIG. 2 is a side view of the headband 100 worn on a user's head 106 (with the overhead loop 104 omitted in FIG. 4). The headband 100 may be comprised of semi-rigid material such as a plastic, or metal including for example aluminum or a shape memory alloy such as alloys of copper-aluminium-nickel. In embodiments, the semi-rigid material may be partially or completely encased within a cushioning material formed of soft material. The soft material may be pliant so as to stretch or wrinkle to allow adjustment of a diameter of the semi-rigid material.

The cushioning material may extend partially or completely around an interior (head-facing) portion of the crown loop 102 to provide a comfortable contact with the user's head 106. The cushioning material may for example be or include polyurethane, a polyurethane foam, rubber or a plastic or other polymer. The cushioning material may alternatively be or include fibers or fabric. Other materials are contemplated. In further embodiments, it is contemplated that, instead of two separate materials (the semi-rigid member(s) and cushioning material), the headband 100 be comprised of a single material which is semi-rigid while at the same time being comfortable against a user's head.

The crown loop 102 may include telescoping sections 102a and 102b, fit together such that section 102a can fit within and translate with respect to section 102b. The inner section 102a is affixed to a cable 108, which is in turn wrapped around a portion of an adjustment mechanism 110. Rotation of the adjustment mechanism in a first direction tensions cable 108 to pull the inner section 102a further within outer section 102b to decrease the diameter of the crown loop 102. Conversely, rotation of the adjustment mechanism in a second direction opposite the first loosens cable 108 allowing the inner section 102a to withdraw partially out of outer section 102b to loosen (increase the diameter of) the crown loop 102. Details of the adjustment mechanism are provided below.

The overhead loop 104 may also include telescoping sections 104a and 104b, fit together such that section 104a can fit within and translate with respect to section 104b. The inner section 104a is affixed to a cable 112, which is in turn wrapped around a portion of the adjustment mechanism 110. Rotation of the adjustment mechanism in the first direction tensions cable 112 to pull the inner section 104a further within outer section 104b to decrease the diameter of the overhead loop 104. Conversely, rotation of the adjustment mechanism in the second direction loosens cable 112 allowing the inner section 104a to withdraw partially out of outer section 104b to loosen (increase the diameter of) the overhead loop 104.

Referring to FIG. 2, the overhead loop 104 may be provided at a fixed angle α with respect to the crown loop 102. In one example, the angle α may be 85°. In this way, the overhead loop 104 may be worn vertically (i.e., in a vertical plane) on the user's head while the crown loop is inclined at a slight angle of 5° with respect to horizontal. It is understood that this orientation of the headband 100 may vary, and the angle α may be greater than or less than 85°, in further embodiments. As explained below, the angle α may be made variable in further embodiments.

Figure 3:
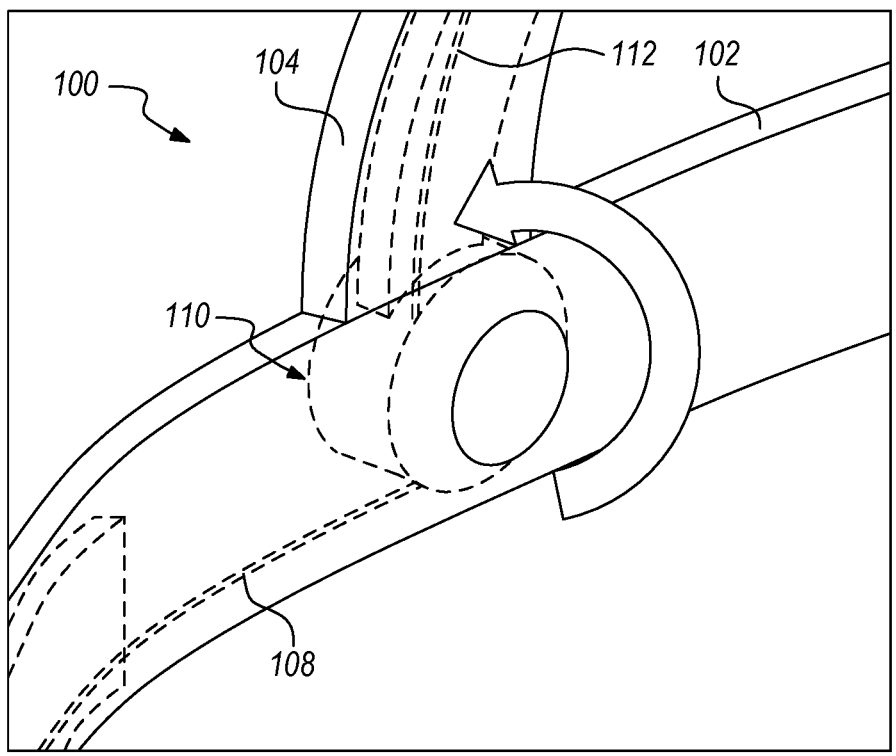
FIG. 3 is an enlarged view of an adjustment mechanism for adjusting both the crown loop and overhead loop.

Referring now to FIGS. 3-5, aspects of the present technology relate to the adjustment mechanism 110, which allows simultaneous tightening of both the crown and overhead loops 102, 104. The adjustment mechanism also automatically adjusts the crown and overhead loops to proper fits for different users having different head sizes. Referring to FIGS. 4 and 5, the adjustment mechanism 110 includes a manual actuator which in embodiments may be a rotatable tightening wheel 120 and shaft 122. The shaft 122 is fixedly mounted to and extending from the tightening wheel 120. The tightening wheel 120 and shaft 122 may be concentric about a rotational axis 124.

The adjustment mechanism 110 further includes at least a pair of tightening and slip components. In embodiments, the tightening and slip components may be a first frictional clutch 126 for tightening (decreasing the diameter of) the crown loop 102, and a second frictional clutch 128 for tightening (decreasing the diameter of) the overhead loop 104. The first and second frictional clutches 126, 128 may be frictionally mounted on the shaft 122, and maintained thereon by a shaft cap 130. The cap 130 may be fixedly mounted to an end of shaft 122. As indicated in FIG. 5, an end of the cable 108 in the crown loop 102 may be affixed to the first frictional clutch 126. An end of cable 112 in the overhead loop 104 may be affixed to the second frictional clutch 128.

The first frictional clutch 126 may include a central aperture 136 receiving the shaft 122 to affix the first frictional clutch 126 to the shaft 122 and tightening wheel 120. In embodiments, the first frictional clutch 126 is not fixedly mounted to the shaft 122, but relative slip between the clutch 126 and shaft 122 is prevented by a first force of friction between the clutch 126 and shaft 122.

The clutch 126 is coupled to the crown loop 102 via a cable 108. The first predefined frictional force is provided such that, when the crown loop 102 is loose around a user's head, the clutch 126 will rotate with the shaft 122 as the tightening wheel 120 is manually rotated. This rotation wraps the cable 108 around the clutch 126 to tighten the crown loop 102 around the crown of a user.

As the crown loop 102 tightens, the force of the crown loop 102 on the clutch 126 increases, and the torque exerted by clutch 126 on the shaft 122 increases. At some point during the rotation of the tightening wheel 120, the torque exerted by the clutch 126 on the shaft 122 overcomes a resistance threshold of the first force of friction, and slip occurs between the clutch 126 and shaft 122. At this point, further rotation of the tightening wheel 120 and shaft 122 in the same direction will not further tighten the crown loop 102.

The first frictional force is defined by a pressure that provides the desired fit and comfort of the crown loop 102. That is, the first frictional force is selected so that the clutch 126 slips when the crown loop 102 exerts a threshold contact pressure, which may be predefined, with at least portions of a user's head. Thus, rotation of the tightening wheel 120 automatically establishes the desired crown loop pressure, but does not exceed the desired pressure. The threshold pressure may vary in embodiments. It may be factory set or varied by a user.

It is noteworthy that the threshold pressure is not dependent on the size of a user's head. Users having larger heads will reach the threshold pressure with relatively few turns of the tightening wheel 120, at which point the clutch 126 slips as the shaft 122 is further rotated. Conversely, users having smaller heads will reach the threshold pressure with more turns of the tightening wheel, at which point the clutch 126 slips as the shaft 122 is further rotated. In this way, the proper fit of the crown loop 102 is automatically established for users regardless of user head size.

The second frictional clutch 128 may include a central aperture 138 receiving the shaft 122 to affix the second frictional clutch 128 to the shaft 122 and tightening wheel 120. As with the clutch 126, the clutch 128 is not fixedly mounted to the shaft 122, but relative slip between the clutch 126 and shaft 122 is prevented by a second force of friction between the clutch 128 and shaft 122.

The clutch 128 is coupled to the crown loop 104 via a cable 112. The second predefined frictional force for clutch 128 is provided such that, when the overhead loop 104 is loose over a user's head, the clutch 128 will rotate with the shaft 122 as the tightening wheel 120 is manually rotated. This rotation wraps the cable 112 around the clutch 128 to tighten the overhead loop 104 over the top of a user's head.

As the overhead loop 104 tightens, the force of the overhead loop 104 on the clutch 128 increases, and the torque exerted by clutch 128 on the shaft 122 increases. At some point during the rotation of the tightening wheel 120, the torque exerted by the clutch 128 on the shaft 122 overcomes a resistance threshold of the second force of friction, and slip occurs between the clutch 128 and shaft 122. At this point, further rotation of the tightening wheel 120 and shaft 122 in the same direction will not further tighten the overhead loop 104.

The second frictional force is defined by a pressure that provides the desired fit and comfort of the overhead loop 104. That is, the first frictional force is selected so that the clutch 126 slips when the overhead loop 104 exerts a threshold contact pressure, which may be predefined, with at least portions of a user's head. Thus, rotation of the tightening wheel 120 automatically establishes the desired overhead loop pressure, but does not exceed the desired pressure. The threshold pressure may vary in embodiments. It may be factory set or varied by a user.

It is noteworthy that the threshold pressure is not dependent on the size of a user's head. Users having larger heads will reach the threshold pressure with relatively few turns of the tightening wheel 120, at which point the clutch 128 slips as the shaft 122 is further rotated. Conversely, users having smaller heads will reach the threshold pressure with more turns of the tightening wheel, at which point the clutch 128 slips as the shaft 122 is further rotated. In this way, the proper fit of the crown loop 102 is automatically established for users regardless of user head size.

The threshold pressure of the crown loop 102 at which slip occurs in clutch 126 may or may not be the same as the threshold pressure of the overhead loop 104 at which slip occurs in clutch 128. As such the first and second predefined frictional forces may be the same of different.

It is understood that the tightening and slip components may have other configurations in further embodiments for slipping at threshold resistances created by the crown loop 102 and overhead loop 104. In one such further embodiments, the tightening and slip component for each of the crown and overhead loops may be a disc mounted to shaft 122 via a frictional bearing. The cable, for example cable 108 of the crown loop 102, may be affixed to the disc. The frictional bearing may have a first portion fixedly mounted to the shaft 122, and a second portion fixedly mounted to the disc. The first and second portions may be provided to resist rotation with respect to each other until a resistance threshold is reached due to a force of the tightening crown loop. At that point, rotation within the frictional bearing occurs. The same frictional bearing may be provided in clutch 128.

In further embodiments, instead of the cable 108/112 wrapping around a frictional clutch, the tightening and slip component may be a frictional rack and pinion arrangement. In such embodiments, rotation of the tightening wheel rotates the pinion, which in turn translates the rack to tighten the cable 108/112 until the desired predetermined pressure is achieved in the crown/overhead loops. A rack and pinion may also replace the cable in further embodiments. Other gearing arrangements may alternatively be used.

The diameter of a frictional clutch may determine how quickly it tightens down the loop 102, 104 to its desired threshold pressure. In embodiments, it may be desired to tighten the crown loop 102 to the desired threshold pressure, and thereafter, tighten the overhead loop 104 to the desired threshold pressure. As such, in embodiments, the clutch 126 may have a larger diameter than the clutch 128, as shown in FIGS. 4 and 5. However, in embodiments, the clutches 126 and 128 may be the same size as shown in FIG. 6, so that the crown and overhead loops tighten down at the same rate. In further embodiments, the clutch 128 may have a larger diameter than the clutch 126 as shown in FIG. 7, so that the overhead loop tightens down more quickly than the crown loop.

Referring again to FIG. 1, the adjustment mechanism may be provided at one of the left or right sides of the headband 100, at a location where the overhead loop 104 meets the crown loop 102. As noted above, the overhead loop 104 may be in a fixed position with respect to the crown loop 102. However, in further embodiments, the overhead loop 104 may be pivotally mounted to the crown loop 102. In such an embodiment, the overhead loop 104 may be mounted at a pair of pivot points at opposite sides of the crown loop 102. One of those pivots points may be the shaft 122 of the adjustment mechanism 110 in embodiments, though the pivot points may be independent of the adjustment mechanism 110 in further embodiments.

Figure 8:
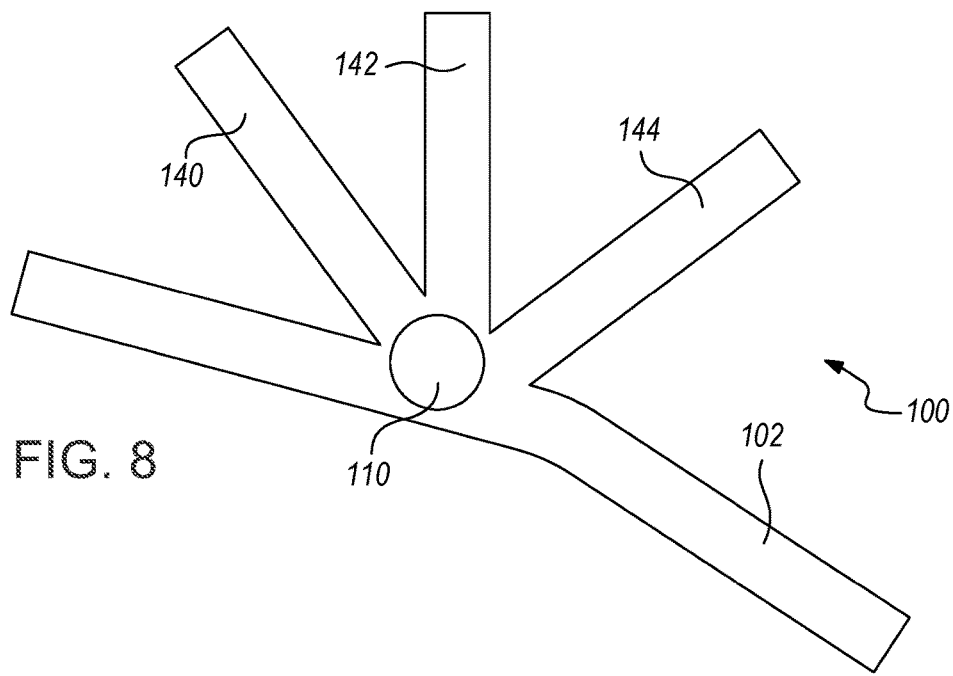
FIG. 8 is a headband including multiple overhead loops and an adjustment mechanism according to further embodiments of the present technology.

In the examples described above, the headband includes a crown loop 102 and a single overhead loop 104. However, in further embodiments, there may be multiple overhead loops. FIG. 8 illustrates an example of three overhead loops 140, 142 and 144. It is understood that there may be two overhead loops or more than three in further embodiments. The adjustment mechanism 110 may include a frictional clutch for the crown loop and each overhead loop 140, 142 and 144, each connecting to a cable in the telescoping loops. In this way, each loop may be tightened simultaneously to one or more threshold pressures upon rotation of the tightening wheel 122 as described above.

In examples, the crown and overhead loops 102, 104 may have a width of between 18 mm to 25 mm, though the width may vary outside of that range in further embodiments. The thickness of the headband may also vary in embodiments, but in examples, may be 2 mm to 5 mm.

Figure 9:
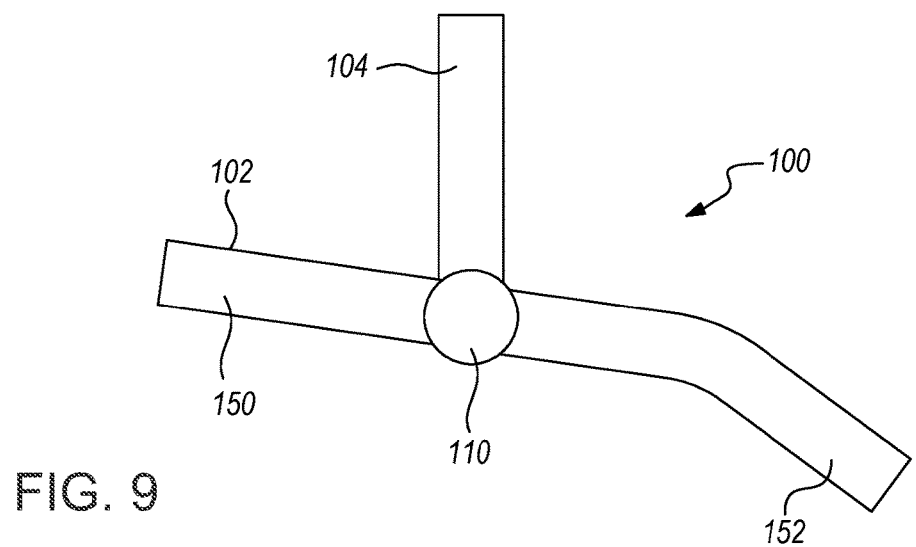
FIG. 9 is a headband including an angled crown loop and an adjustment mechanism according to further embodiments of the present technology.

In the above-described embodiments, the crown loop 102 of the headband 100 may be generally planar. That is, crown loop 102 may have upper and lower edges, each residing in planes that are parallel to each other. In further embodiments, such as shown in FIG. 9, the crown loop 102 may include front and rear sections 150, 152 which are angled with respect to each other. The discontinuous angle allows the front section 150 to be worn higher on a user's head than would a front portion of a planar crown loop 102. For some users, this may be a more comfortable fit.

In embodiments described above, the adjustment mechanism 110 is positioned at a side of the headband 100. However, it is understood that the adjustment mechanism 110 may be positioned in other locations in further embodiments. In one such example, shown in FIG. 10, the adjustment mechanism 110 is positioned in a rear portion of the headband 100. In such an embodiment, the tightening wheel 120 may be rotated to tighten cable 108 and adjust the diameter of the crown loop 102 down to a desired threshold pressure around a user's head as described above. The cable 112 within the overhead loop may also be connected to the adjustment mechanism 110 via a pulley 160. Thus, the tightening wheel 120 may be rotated to also tighten cable 112 and adjust the diameter of the overhead loop 104 down to a desired threshold pressure on a user's head as described above. Using pulley 160, a single adjustment mechanism 110 may be used to adjust both the crown and overhead loops 102, 104 to the desired pressure at the same time.

In summary, in a first example, the present technology relates to a headband, comprising: a first loop adapted to be worn in contact with a first portion of a wearer's head; a second loop adapted to be worn in contact with a second portion of a wearer's head; and an adjustment mechanism including a manual actuator for manually tightening the first and second loops, tightening of the first loop stopping while actuation of the manual actuator continues upon the first loop reaching a threshold contact pressure with the first portion of the wearer's head In a second example, the present technology relates to a headband, comprising: a first loop adapted to be worn in contact with a first portion of a wearer's head; a second loop adapted to be worn in contact with a second portion of a wearer's head; and an adjustment mechanism for tightening the first loop to a first threshold contact pressure on the first portion of the wearer's head, the adjustment mechanism preventing tightening of the first loop beyond the first threshold contact pressure, and for tightening the second loop, simultaneously with tightening of the first loop, to a second threshold contact pressure on the second portion of the wearer's head, the adjustment mechanism preventing tightening of the second loop beyond the second threshold contact pressure.

In a further example, the present technology relates to a headband, comprising: a first loop adapted to be worn in contact with a first portion of a wearer's head; a second loop adapted to be worn in contact with a second portion of a wearer's head; and an adjustment mechanism, comprising: a manual actuator, a first tightening and slip component affixed to a portion of the first loop such that actuation of the first tightening and slip component tightens the first loop against the first portion of the wearer's head, the first tightening and slip component also affixed to the manual actuator such that actuation of the manual actuator actuates the first tightening and slip component until a force on the first tightening and slip component from tightening of the first loop exceeds a first threshold, at which point further actuation of the manual actuator no longer actuates the first tightening and slip component, and a second tightening and slip component affixed to a portion of the second loop such that actuation of the second tightening and slip component tightens the second loop against the second portion of the wearer's head, the second tightening and slip component also affixed to the manual actuator such that actuation of the manual actuator actuates the second tightening and slip component until a force on the second tightening and slip component from tightening of the second loop exceeds a second threshold, at which point further actuation of the manual actuator no longer actuates the second tightening and slip component.

In another example, the present technology relates to a headband, comprising: a first loop adapted to be worn in contact with a first portion of a wearer's head; a second loop adapted to be worn in contact with a second portion of a wearer's head; and means for tightening the first loop to a first threshold contact pressure on the first portion of the wearer's head, the means preventing tightening of the first loop beyond the first threshold contact pressure, and means for tightening the second loop, simultaneously with tightening of the first loop, to a second threshold contact pressure on the second portion of the wearer's head, the means preventing tightening of the second loop beyond the second threshold contact pressure.

Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

We claim:

1. A headband, comprising:
   a crown loop comprising first telescoping sections for adjusting a diameter of the crown loop, the crown loop configured to encircle a head of a user;
   an overhead loop with ends fixed to opposing sides of the crown loop, the overhead loop comprising second telescoping sections for adjusting a length of the overhead loop, the overhead loop configured to be worn over a top of the head of the user; and
   an adjustment mechanism comprising:
      a rotatable tightening wheel mounted on a shaft and connected to the crown loop and the overhead loop such that rotation of the rotatable tightening wheel in a first direction turns the shaft and causes the diameter of the crown loop to be reduced via the first telescoping sections and simultaneously causes the length of the overhead loop to be reduced via the second telescoping sections, and
      first and second frictional clutches mounted on the shaft such that the adjustment mechanism tightens the crown loop via a first friction of the first frictional clutch against the shaft and tightens the overhead loop via a second friction of the second frictional clutch against the shaft, wherein the first frictional clutch slips when a first threshold resistance of the first friction is overcome thereby stopping the tightening of the crown loop, while tightening of the overhead loop continues with continued rotation of the rotatable tightening wheel.

2. The headband of claim 1, wherein additionally the second frictional clutch slips when a second threshold resistance of the second friction is overcome thereby stopping the tightening of the overhead loop, while tightening of the crown loop continues with continued rotation of the rotatable tightening wheel.

3. The headband of claim 1, wherein the tightening of the overhead loop continues until a second threshold resistance of the second friction is overcome, causing the second frictional clutch to slip, thereby stopping the tightening of the crown loop.

4. The headband of claim 3, wherein, when in use, the first and second threshold resistances are related to first and second threshold contact pressures, respectively, with the head of the user.

5. The headband of claim 4, wherein the first and second threshold contact pressures are the same as each other.

6. The headband of claim 4, wherein the first and second threshold contact pressures are different from each other.

7. The headband of claim 1, wherein the first frictional clutch is connected to the crown loop via a first cable and the second frictional clutch is connected to the overhead loop via a second cable.

8. The headband of claim 1, wherein the crown loop is configured to fully encircle the head of the user.

9. A headband, comprising:
   a crown loop comprising first telescoping sections for adjusting a diameter of the crown loop on a head of a user;
   a first overhead loop with first and second ends fixed to opposing sides of the crown loop, the first overhead loop comprising second telescoping sections for adjusting a length of the first overhead loop;
   a rotational tightening wheel mounted on a shaft and connected to the first and second telescoping sections, wherein the rotational tightening wheel is configured to simultaneously adjust the diameter of the crown loop and the length of the first overhead loop; and a clutch mounted on the shaft such that the rotational tightening wheel decreases the diameter of the crown loop via the clutch, wherein the clutch slips when a threshold resistance of the clutch to rotation around the shaft is overcome, thereby halting the decrease of the diameter of the crown loop with further rotation of the rotational tightening wheel while the length of the first overhead loop continues to decrease.

10. The headband of claim 9, further comprising a second overhead loop with third and fourth ends fixed to the opposing sides of the crown loop, the second overhead loop comprising third telescoping sections for adjusting a length of the second overhead loop, the rotational tightening wheel connected to the third telescoping sections such that the rotational tightening wheel simultaneously adjusts the crown loop, the first overhead loop, and the second overhead loop.

11. The headband of claim 9, further comprising a second clutch mounted on the shaft such that the rotational tightening wheel decreases the length of the first overhead loop via the second clutch.

12. The headband of claim 11, wherein the second clutch slips when another threshold resistance of the second clutch to rotation around the shaft is overcome, thereby halting the decrease of the length of the first overhead loop with further rotation of the rotational tightening wheel.

13. The headband of claim 9, wherein the rotational tightening wheel simultaneously decreases the diameter of the crown loop and the length of the first overhead loop when turned in a first rotational direction and simultaneously increases the diameter of the crown loop and the length of the first overhead loop when turned in a second, opposite rotational direction.

14. A headband, comprising:
a crown loop configured to fully encircle a head of a user;
an overhead loop with first and second ends fixed to opposing sides of the crown loop; and
an adjustment mechanism, comprising:
  a tightening wheel, and
  a first clutch coupled to the crown loop and a second clutch coupled to the overhead loop such that turning the tightening wheel in a first direction simultaneously decreases a diameter of the crown loop and decreases a length of the overhead loop,
  wherein, when in use, the first clutch slips when a resistance to rotation of the first clutch is overcome such that with further rotation of the tightening wheel, the diameter of the crown loop does not decrease further while the length of the overhead loop continues to decrease.

15. The headband of claim 14, wherein the resistance to rotation of the first clutch is related to a contact pressure of the crown loop against the head of the user.

16. The headband of claim 14, wherein the first clutch and the second clutch comprise frictional clutches.

17. The headband of claim 14, wherein the first and second clutches have different diameters.

18. The headband of claim 14, wherein turning the tightening wheel in a second direction increases the diameter of the crown loop and increases the length of the overhead loop.

19. The headband of claim 14, further comprising a shaft, wherein the first clutch and the tightening wheel are mounted on the shaft.

20. The headband of claim 19, wherein the second clutch is mounted on the shaft.

* * * * *